US008228092B2

(12) United States Patent
Stirk et al.

(10) Patent No.: US 8,228,092 B2
(45) Date of Patent: Jul. 24, 2012

(54) HIGH VOLTAGE LATCHING AND DC RESTORATION ISOLATION AND LEVEL SHIFTING METHOD AND APPARATUS

(75) Inventors: Gary Stirk, West Melbourne, FL (US); Jong-Dii Jiang, Herndon, VA (US); John Houldsworth, Reston, VA (US)

(73) Assignee: Texas Instruments Northern Virginia Incorporated, Herndon, VA (US)

( * ) Notice: Subject to any disclaimer, the term of this patent is extended or adjusted under 35 U.S.C. 154(b) by 148 days.

(21) Appl. No.: 12/441,326

(22) PCT Filed: Aug. 30, 2007

(86) PCT No.: PCT/US2007/077207
§ 371 (c)(1),
(2), (4) Date: Oct. 19, 2010

(87) PCT Pub. No.: WO2008/033674
PCT Pub. Date: Mar. 20, 2008

(65) Prior Publication Data
US 2011/0031944 A1 Feb. 10, 2011

Related U.S. Application Data

(60) Provisional application No. 60/825,823, filed on Sep. 15, 2006.

(51) Int. Cl.
*H03K 19/0175* (2006.01)
*G01R 31/00* (2006.01)
*H03L 5/00* (2006.01)
(52) U.S. Cl. ............... 326/82; 324/500; 327/333
(58) Field of Classification Search .......... 326/80, 326/83, 86, 87; 327/333; 324/500
See application file for complete search history.

(56) References Cited

U.S. PATENT DOCUMENTS

| | | | |
|---|---|---|---|
| 2002/0171694 A1* | 11/2002 | Takayanagi | 347/5 |
| 2009/0184760 A1* | 7/2009 | Hauenstein | 327/594 |
| 2010/0254478 A1* | 10/2010 | Barrenscheen | 375/286 |
| 2012/0043823 A1* | 2/2012 | Stratakos et al. | 307/82 |

* cited by examiner

*Primary Examiner* — Shawki S Ismail
*Assistant Examiner* — Dylan White
(74) *Attorney, Agent, or Firm* — William B. Kempler; Wade J. Brady, III; Frederick J. Telecky, Jr.

(57) ABSTRACT

A device and method for dc isolation and level shifting includes a driver circuit powered by a first voltage range, a capacitor connected to the driver circuit, and a latching circuit connected to the capacitor. The latching circuit is powered by a second voltage range and is configured to restore and/or minimize charge loss of the capacitor during a voltage transition at the capacitor. A device and method for analog isolation and measurement configured to measure an analog voltage at a second potential without requiring analog circuits at the second potential.

16 Claims, 11 Drawing Sheets

US 8,228,092 B2

HIGH VOLTAGE LATCHING AND DC RESTORATION ISOLATION AND LEVEL SHIFTING METHOD AND APPARATUS

RELATED APPLICATIONS

The present application is a national stage entry of PCT Patent Application No. PCT/US07/077207, filed 30 Aug. 2007 and claims the benefit of U.S, Provisional Application 60/825,823 filed Sep. 15, 2006, which is incorporated by reference herein in its entirety.

FIELD OF THE INVENTION

The present invention relates generally to voltage generation and control and more particularly to isolated voltage latching and voltage level shifting.

BRIEF SUMMARY

An aspect of the present invention is to provide a device for dc isolation and level shifting. The device includes a driver circuit powered by a first voltage range, a capacitor connected to the driver circuit, and a latching circuit connected to the capacitor. The latching circuit is powered by a second voltage range and is configured to restore and/or minimize charge loss of the capacitor during a voltage transition at the capacitor.

Another aspect of the present invention is to provide a device for dc isolation and level shifting, the device including first, second, third and fourth inverters, and a capacitor. An output of the first inverter is connected to an input of the second inverter and an input of the first inverter is connected to an output of the second inverter. An output of the third inverter is connected to an input of the fourth inverter and an output of the fourth inverter is connected to an input of the third inverter. One terminal of the capacitor is connected to the output of the first inverter and the input of the second inverter and another terminal of the capacitor is connected to the input of the third inverter and to the output of the fourth inverter.

A further aspect of the present invention is to provide an analog level shifting and isolation circuit. The analog level shifting and isolation circuit includes a first analog switch, a first capacitor connected at a first end to the first analog switch, and a second analog switch connected at a second end of the first capacitor. The analog level shifting and isolation circuit further includes a second capacitor connected in parallel with the second analog switch, such that a first end of the second capacitor is connected to the first end of the second analog switch and to the second end of the first capacitor, and a second end of the second capacitor is connected to a second end of the second analog switch. The analog level shifting and isolation circuit also includes an operational amplifier connected in parallel to the second capacitor, such that a first input of the operational amplifier is connected to the first end of the second capacitor and to the first end of the second analog switch, a second input of the operational amplifier is connected to a voltage reference and an output of the operational amplifier is connected to the second end of the second capacitor and to the second end of second analog switch.

Another aspect of the present invention is to provide a V-bus circuit including a first level circuit, a level shifter connected to the first level circuit, a second level circuit connected to the level shifter, and a capacitor connected to a terminal of the second level shifter. The level shifter is configured to control inputs of the first and second level circuits.

Another aspect of the present invention is to provide a circuit for controlling and monitoring voltages. The circuit includes a first V-bus circuit, a first measurement and control circuit in communication with the first V-bus circuit, and a second measurement and control circuit in communication with the first measurement and control circuit. The first and second measurement and control circuits are configured to operate in different voltage ranges.

A further aspect of the present invention is to provide a method for dc isolation and level shifting. The method includes powering a driver circuit by a first voltage range and powering a latching circuit by a second voltage range, the latching circuit being connected to the driver circuit via a capacitor such that during a voltage transition at the capacitor, the latching circuit restores and/or minimizes charge loss of the capacitor.

Yet another aspect of the present invention is to provide a method for monitoring and controlling a series of batteries. The method includes operating first and second measurement circuits in different voltage ranges, the second measurement and control circuit being in communication with the first measurement and control circuit and the first measurement and control circuit being in communication with a V-bus circuit. The method further includes controlling a voltage of a series of batteries connected to the first and the second measurement and control circuits using the V-bus circuit.

DESCRIPTION OF EMBODIMENTS OF THE INVENTION

Figure 1A:
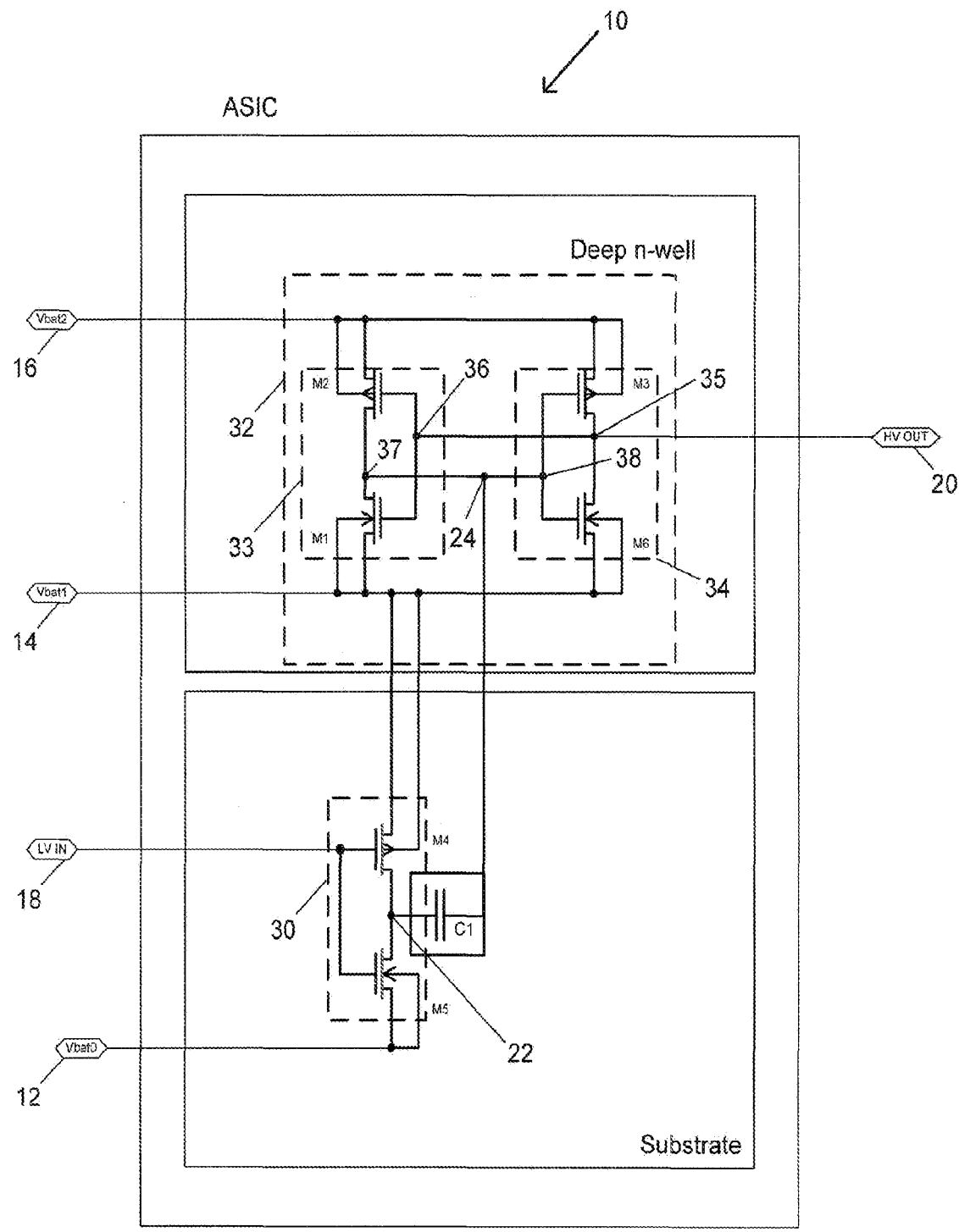
FIG. 1A is a schematic of an electronic circuit for DC isolation, DC level shifting and DC restore, according to an embodiment of the invention.

FIG. 1A is a schematic of an electronic circuit for DC isolation, DC level shifting and DC restore, according to an embodiment of the present invention. The electronic circuit 10 has power inputs Vbat0 12, Vbat1 14 and Vbat2 16. The electronic circuit has input LV IN 18 and output HV OUT 20. The circuit 10 comprises metal oxide semiconductor field effect transistors (MOSFET) M1, M2, M3, M4, M5 and M6. Transistors M1, M2, M3, M4, M5 and M6 are "enhancement mode" MOSFETs.

Figure 1B:
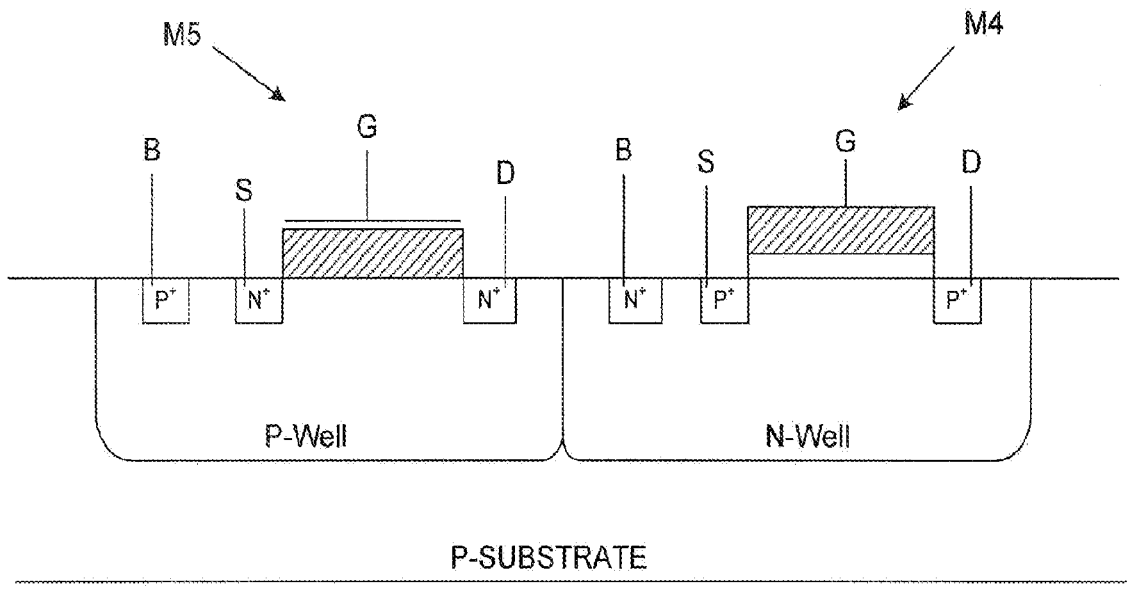
FIG. 1B depicts a schematic structural representation of the transistors M4 and M5, according to an embodiment of the invention.

In FIG. 1A, the transistors with an arrow pointing towards the gate of the transistor are N-channel transistors and the transistors with an arrow pointing away from the gate of the transistor are P-channel transistors. In the case of transistors M4 and M5, the substrate is a P-substrate. FIG. 1B depicts schematically a structure of the transistors M4 and M5, according to an embodiment of the present invention. As shown in FIG. 1B, the transistor M4 is a P-channel transistor and the transistor M5 is a N-channel transistor. The transistor M4 is formed in an N-well in the P-substrate and transistor M5 is formed in a P-well in the P-substrate using standard CMOS fabrication technology. The transistor M4 which is a P-channel transistor may have a P+ N-well P+ structure, with P+ doped areas corresponding to the source and drain areas of the transistor. The transistor M5 which is a N-channel transistor may have a N+ P-well N+ structure, with the N+ doped areas corresponding to the source and the drain areas of the transistor. The areas labeled "B" correspond to higher doped areas with respect to the bulk. In the case of transistor M4 which is formed in an N-well, the "B" area is a higher doped N+ area than the bulk N-well. In the case of transistor M5 which is formed in a P-well, the "B" area is a higher doped P+ area than the bulk P-well.

Figure 1C:
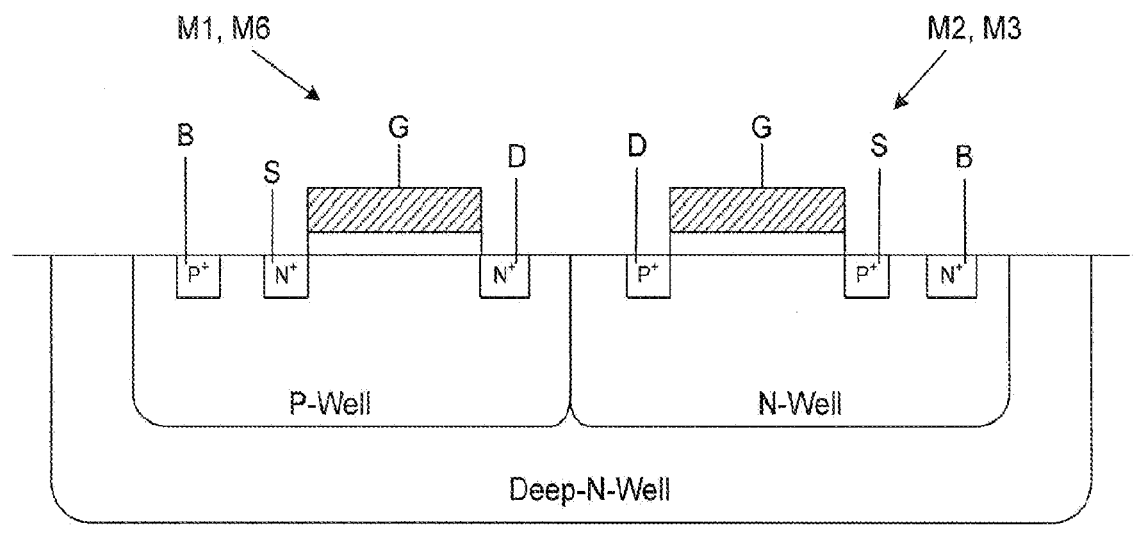
FIG. 1C depicts a schematic structural representation of transistors M1, M2, M3 and M6, according to an embodiment of the invention.

FIG. 1C depicts schematically a structure of the transistors M1, M2, M3 and M6, according to an embodiment of the present invention. As shown in FIG. 1C, transistors M1, M2, M3 and M6 are formed in a deep N-well in the P-substrate. For deep N-well isolation, an N-doped region is usually implanted or diffused into a P-substrate. The P-substrate is connected to a most negative potential used by the circuit and the deep N-well is tied to the most positive portion of the circuit. This forms a reverse biased junction providing junction isolation of devices within the deep N-well region from devices within the P-substrate. The two regions can be operated or connected at different potentials.

As shown in FIG. 1C, the transistor M1 is a N-channel transistor. The transistor M1 is formed in a P-well which is formed in a deep N-well formed in the P-substrate. The transistor M1 may have a N+ P-well N+ structure, with the N+ doped areas corresponding to the source and drain areas of the transistor. The transistor M2 is a P-channel transistor. The transistor M2 is formed in a N-well which is formed in a deep N-well formed in the P-substrate. The transistor M2 may have a P+ N-well P+ structure, with the P+ doped areas corresponding to the source and drain areas of the transistor. The transistor M3 is a P-channel transistor. The transistor M3 is formed in a N-well which is formed in a deep N-well formed in a P-substrate. The transistor M3 may have a P+ N-well P+ structure, with the P+ doped areas corresponding to the source and drain areas of the transistor. The transistor M6 is a N-channel transistor. The transistor M6 is formed a P-well which is formed in a deep N-well formed in the P-substrate. The transistor M6 may have a N+ P-well N+ structure, with the N+ doped areas corresponding to the source and drain areas of the transistor. The areas labeled "B" correspond to higher doped areas with respect to the bulk. In the case of transistors M2 and M3 which are formed in an N-well, the "B" area is a higher doped N+ area than the bulk N-well. In the case of transistors M1 and M6 which are formed in a P-well, the "B" area is a higher doped P+ area than the bulk P-well.

As shown in FIG. 1A, input LV IN 18 is connected to gates of P-channel transistor M4 and N-channel transistor M5. The source of transistor M4 is connected to Vbat1 14. The source of transistor M5 is connected to Vbat0 12. The drain of transistor M4 is connected to the drain of transistor M5 and are both connected to one terminal 22 of capacitor C1. The capacitor C1 is a metal-intrinsic-metal (MiM) capacitor. The capacitor C1 can be formed by layering a first layer of metal, an intrinsic oxide layer and a second layer of metal. The first and second layers of metal may correspond to a first and a second level of metal that may be used for routing in the semiconductor circuit. This type of capacitor provides isolation between any layers in a semiconductor circuit or device. The capacitor C1 can be disposed internal to the semiconductor device, i.e., within the circuit 10, or external to the semiconductor device, i.e. outside circuit 10.

A source or driver circuit 30 formed by transistors M4 and M5 drives the capacitor C1. The deep N-well side of the MiM capacitor C1 is connected to an active CMOS circuit 32 at connection point 24. Specifically, the other terminal of capacitor C1 is connected to common connection point 24 which corresponds to a junction point between the gates of transistors M3 and M6. Indeed, rather than connecting the deep N-well side to a resistor pull up as practiced conventionally, the deep N-well side is connected to CMOS circuit 32. The CMOS circuit 32 comprises two inverters 33 and 34. The inverter 33 is formed by transistors M1 and M2 and the inverter 34 is formed by transistors M3 and M6.

100281 The source of N-channel transistor M1 is connected to Vbat1 14. The drain of the transistor M1 is connected to the drain of P-channel transistor M2. The source of transistor M2 is connected to Vbat2 16. The gate of transistor M1 and the gate of transistor M2 are connected to each other. The source of N-channel transistor M6 is also connected to Vbat1 14. The drain of transistor M6 is connected to the drain of P-channel transistor M3. The source of transistor M3 is connected to Vbat2 16. The gate of transistor M6 is connected to the gate of transistor M3. A common point 37 between the drains of transistors M1 and M2 is connected to a common point 38 between the gates of transistors M3 and M6. A common point 36 between the gates of transistors M1 and M2 is connected to a common point 35 between the drains of transistors M3 and M6 which in turn is connected to HV OUT 20. Connection point 35 corresponds to the output of inverter 34. Connection point 36 corresponds to an input of inverter 33. Connection point 37 corresponds to an output of inverter 33. Connection point 38 corresponds to an input of inverter 34.

Therefore, output 35 of inverter 34 is connected to input 36 of inverter 33 and output 37 of inverter 33 is connected to input 38 of inverter 34. As stated above, one terminal of capacitor C1 is connected to common connection point 24 which is a junction point between points 37 and 38. In other words, the MiM capacitor C1 is connected to input/output 37, 38 via connection point 24. Inverter 33 (comprising transistors M1 and M2) having an output driving MiM capacitor C1, is designed so the drive is small.

Although, the source circuit 30 is depicted being disposed in the P-substrate and the CMOS circuit 32 is depicted being disposed in the deep N-well, it must be appreciated that this configuration can be reversed by putting the source circuit 30 in the deep N-well and putting the CMOS circuit 32 in the P substrate.

As will be explained further in detail in the following paragraphs, since the transistors M4 and M5 are driving only capacitor C1, there may be substantially no DC load presented and any charge loss on C1 can be restored. The devices for inverter 34, i.e., transistors M3 and M6, are configured to provide strong drive back to inverter 33, i.e., transistors M1 and M2, thus minimizing charge loss of C1 during a transition. The strong drive on the inverter 34 also allows the inverter 34 to act as a buffer to internal or external circuits. The configuration of N and P MOS devices (e.g., transistors M1, M2, M3 and M6) in deep N-well provide low voltage circuits at elevated potentials. The connection of the deep N-well to a higher potential along with the MiM capacitor C1 provides both level shifting and switching control without typical power consumption required by conventional approaches. The DC current in either the high or low state of the elevated isolated circuit is substantially zero.

In operation, if the voltage applied at input LV IN 18 becomes low, the transistor M4 acts a closed switch and conducts and the transistor M5 acts as an open switch and does not conduct. The voltage at connection point 22 thus becomes a relatively high voltage. The capacitor C1 passes voltage transitions from point 22 to point 24. Therefore, if the voltage at point 22 transitions to high, the voltage at point 24 becomes high. The voltage at point 38 (which correspond to voltage at gates of transistors M3 and M6) is the same as the voltage at point 24. Hence, the voltage at the gate of both transistors M3 and M6 becomes high. The weak drive of inverter 33 is not able to overcome this high value for at least a short period of a time.

If the voltage at the gate of transistor M3 becomes high, the transistor M3 acts as an open switch and does not conduct. If the voltage at the gate of transistor M6 becomes high, the transistor M6 acts as a closed switch and conducts. Hence, the voltage at point 35, which also corresponds to the voltage at output HV OUT 20, becomes low.

The voltage at point 35 is the same as a voltage at point 36 which corresponds to the voltage at gates of transistors M1 and M2. If the voltage at point 36 becomes low, the transistor M1 acts as an open switch and does not conduct and the transistor M2 acts as a closed switch and conducts. As a result, the voltage at point 37 becomes high. In other words, the inverter 33 comprising transistors M1 and M2 inverts the input signal at point 36 from a low voltage to output a high voltage signal at output 37 of the inverter 33. Because point 37 has a same voltage as point 24, as these two points are directly connected, the high voltage obtained at point 37 reinforces the high voltage of end point 24 of MiM capacitor C1 to restore and/or minimize any charge loss of capacitor C1 during a voltage transition (from low voltage to high voltage or vice versa).

If, on the other hand, the voltage applied at input LV IN 18 becomes high, the transistor M4 acts an open switch and does not conduct and the transistor M5 acts a closed switch and conducts. The voltage at connection 22 thus becomes a relatively low voltage. The capacitor C1 passes transitions from point 22 to point 24. If the voltage at point 22 becomes low, the voltage at point 24 becomes also low. As a result the voltage at the gate of both transistors M3 and M6 becomes low. The weak drive of inverter 33 is not able to overcome this low value for at least a short period of time.

If the voltage at the gates of transistors M3 and M6 becomes low, the transistor M3 acts as a closed switch and conducts and the transistor M6 acts as an open switch and does not conduct. Hence, the voltage at point 35, which also corresponds to the voltage at output HV OUT 20, becomes high.

The voltage at point 35 is the same as a voltage at point 36 which corresponds to voltage at gates of transistors M1 and M2. If the voltage at point 36 becomes high, the transistor M1 acts as a closed switch and conducts and the transistor M2 acts as an open switch and does not conduct. As a result, the voltage obtained at point 37 becomes low. In other words, the inverter 33 comprising transistors M1 and M2 inverts the input signal at point 36 from a high voltage to output a low voltage signal at output 37 of the inverter 33.

Because point 37 has a same voltage as point 24, as these two points are directly connected, the low voltage obtained at point 37 reinforces or latches the low voltage of end point 24 of MiM capacitor C1 to restore and/or minimize any charge loss of capacitor C1 during a voltage transition (from low voltage to high voltage or vice versa).

Keep in mind that references to low and high voltage values at input LV IN 18 are relative to voltages Vbat0 12 and Vbat1 14. In contrast, references to low and high voltage values at output HV OUT 20 are relative to voltages Vbat1 14 and Vbat2 16. Since voltages Vbat2 16 and Vbat1 14 are higher than voltages Vbat1 14 and Vbat0 12, the circuit of FIG. 1A shifts the logic values at LV IN 18 to a higher voltage reference at HV OUT 20.

Figure 2:
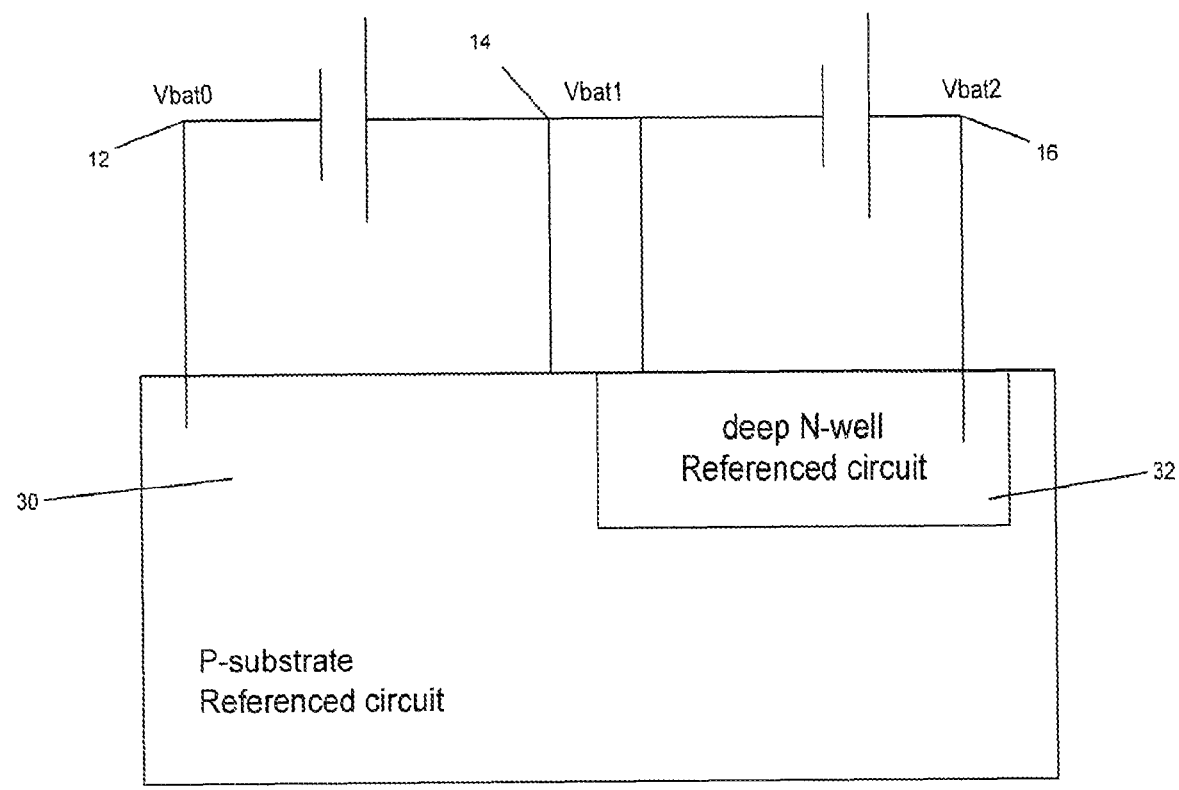
FIG. 2 is a schematic structural representation of the substrate isolation circuit 10 depicted in FIG. 1A.

FIG. 2 is schematic structural representation of the substrate isolation circuit 10 depicted in FIG. 1A. The source circuit 30 is provided in the P-substrate and latching DC restoration circuit 32 is provided in the deep N-well region. The P-substrate and the deep N-well region are isolated from each other by the junction isolation PN (P-substrate to N-well). The various potentials applied to the source circuit 30 and the latching DC restoration circuit 32 are respectively Vbat0 at 12, Vbat1 at 14 and Vbat 2 at 16 to reverse bias the PN junction. Typically, deep N-well would be at Vbat1 and only provide noise isolation.

Figure 3:
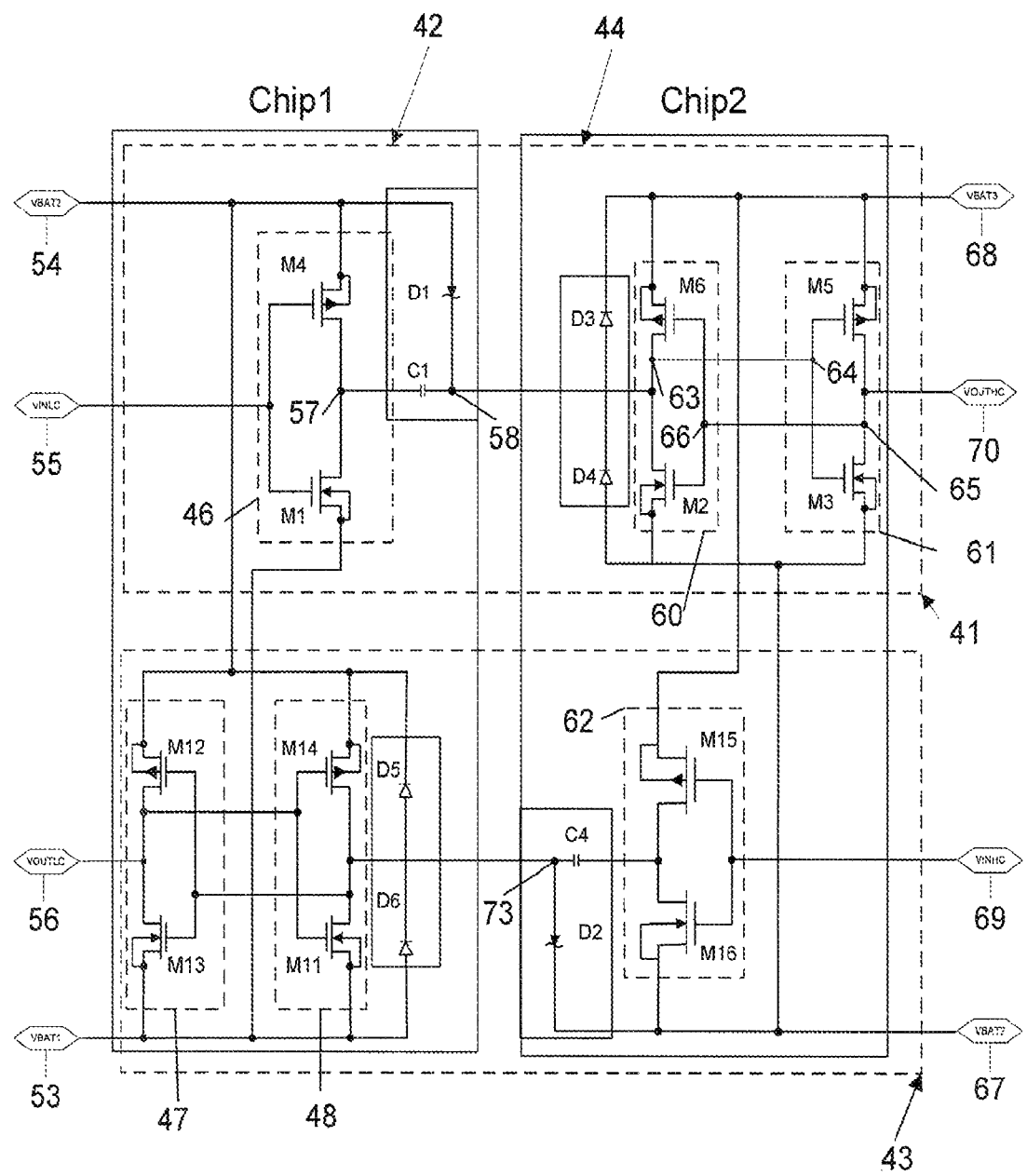
FIG. 3 shows circuits for level shifting between devices at different potentials in a bi-directional manner, according to an embodiment of the present invention.

FIG. 3 shows circuits for level shifting between devices at different potentials in a bi-directional manner, according to an embodiment of the present invention. Circuits 41 and 43 provide level shifting in two directions between devices 42 and 44. Specifically, circuit 41, which includes inverter 46 in device 42 (chip1) and inverters 60 and 61 in device 44 (chip2), provides a level shifting in one direction (i.e., in the direction VINLC 55 to VOUTHC 70) similar to the circuit 10 depicted in FIG. 1A. On the other hand, circuit 43, which includes inverter 62 in device 44 (chip2) and inverters 47 and 48 in device 42 (chip1), provides level shifting in the other direction (i.e., in the direction VINHC 69 to VOUTLC 56). The device 42 can be referenced to deep N-well while the device 44 can be referenced to a P-substrate. However, it must be appreciated that the device 42 can also be referenced to the P-substrate while the device 44 can be referenced to deep N-well. Device 42 is at one potential and device 44 is at an elevated potential.

Circuit 41 comprises three inverters 46, 60 and 61. Inverter 46 comprises transistors M1 and M4. Inverter 60 comprises transistors M2 and M6. Inverter 61 comprises transistors M3 and M5. The circuit 41 has power inputs 53 at Vbat1 and 54 at Vbat2. The circuit 41 has input VINLC 55 and output VOUTHC 70. VINLC 55 is connected to the gate of transistor M1 and the gate of transistor M4. The source of transistor M1 is connected to Vbat1 53. The source of transistor M4 is connected to Vbat2 54. The drain of transistor M1 is connected to the drain of transistor M4. The drain of transistor M1 and the drain of transistor M4 are both connected to one terminal of capacitor C1 via connection point 57. The input VINLC 55 is an input of inverter 46 which drives capacitor MiM capacitor C1 via connection point 57, in a similar manner as inverter 30 shown in FIG. 1A. However, contrary to the circuit 10, in circuit 41, an end 58 of MiM capacitor C1 is connected to a separate device 44 (chip2). Furthermore, circuit 41 includes a diode D1. One terminal of diode D1 is connected to point 58 and another terminal of diode D1 is connected to Vbat2 54. Diode D1 is provided in device 42.

Connection point 58 is connected to connection point 63 between the drains of transistors M2 and M6. The drain of transistor M2 is connected to the drain of transistor M6. The gate of transistor M2 is connected to the gate of transistor M6. A common connection point 64 between the gates of transistors M3 and M5 is connected to a common connection point 63 between the drains of transistors M2 and M6. The gate of transistor M3 is connected to gate of transistor M5. The source of transistor M3 is connected to Vbat2 67 and the source of transistor M5 is connected to Vbat3 68. The drain of transistor M3 is connected to the drain of transistor M5. A common connection point 65 between the drains of transistors M3 and M5 is connected to a common connection point 66 between gates of transistors M2 and M6. In addition, the connection point 65 is connected to VOUTHC 70.

In addition to diode D1, the circuit 41 also includes two other diodes D3 and D4. The diodes D3 and D4 are provided in device 44. One terminal of diode D3 is connected to connection point 63 and another terminal of diode D3 is connected to Vbat3 68. One terminal of diode D4 is connected to connection point 63 and another terminal is connected to Vbat2 67.

In operation, when the input voltage applied at input VINLC 55 becomes a low voltage, the transistor M1 acts an open switch and does not conduct and the transistor M4 acts as a closed switch and conducts. The transistor pair M1 and M4 of inverter 46 invert the signal input from low to high. The voltage at connection 57 thus becomes a relatively high voltage. The capacitor C1 passes voltage transitions from point 57 to point 58. If the voltage at point 57 becomes high, the voltage at point 58 also becomes high. The high voltage at point 58 is transferred to the device 44.

If, on the other hand, the input voltage at input VINLC 55 becomes a high voltage, the transistor M1 acts as a closed switch and conducts and the transistor M4 acts as an open switch and does not conduct. The transistor pair M1 and M4 of inverter 46 invert the signal input from a high voltage to a low voltage. The voltage at connection 57 thus becomes a low voltage. The capacitor C1 passes voltage transitions from point 57 to point 58. Hence, the voltage at point 58 also becomes low and is transferred to the device 44.

The voltage output by the device 42 at point 58 is the same voltage at point 63 and point 64 as all these points are directly connected. Therefore, when the voltage at point 58 becomes high (when the voltage applied at VINLC 55 becomes low), the voltage at point 63 also becomes high. The weak drive of inverter 61 is not able to overcome this high voltage value for at least a short period of time. The voltage at point 63 is the same as voltage at point 64. Hence, the voltage at point 64 also becomes high. As a result, the transistor M5 operates as an open switch and does not conduct, whereas the transistor M3 operates as a closed switch and conducts. Hence, the voltage obtained at point 65, which also corresponds to voltage at output VOUTHC 70, becomes a low voltage. The voltage at point 65 is the same voltage as point 66 as these two points are directly connected. Hence, when the voltage at point 65 becomes low, the voltage at point 66 also becomes low. If the voltage at point 66 becomes low, the transistor M2 operates as an open switch and does not conduct and the transistor M6 operates as a closed switch and conducts. As a result, the voltage at point 63 becomes a high voltage. Consequently, the voltage at point 58 also becomes a high voltage. The high voltage obtained at point 63 reinforces or latches the high voltage at point 58 of MiM capacitor C1 to restore and/or minimize any charge loss of capacitor C1 during a voltage transition (from low voltage to high voltage or vice versa).

When the voltage at point 58 becomes low (when the voltage applied at VINLC 55 becomes high), the voltage at point 63 also becomes low. The weak drive of inverter 61 is not able to overcome this low voltage value for at least a short period of time. The voltage at point 64 which is the same as the voltage at point 63 also becomes low. As a result, the transistor MS operates as a closed switch and conducts, whereas the transistor M3 operates as an open switch and does not conduct. Hence, the voltage obtained at point 65, which also corresponds to voltage at output VOUTHC 70, becomes a high voltage. The voltage at point 65 is the same voltage as point 66 as these two points are directly connected. Hence, the voltage at point 66 also becomes high.

If the voltage at point 66 becomes high, the transistor M2 operates as a closed switch and conducts and the transistor M6 operates as an open switch and does not conduct. As a result, the voltage at point 63 becomes a low voltage. Consequently, the low voltage obtained at point 63 reinforces or latches the low voltage of point 58 of MiM capacitor C1 to restore and/or minimize any charge loss of capacitor C1 during a voltage transition (from low voltage to high voltage or vice versa).

Similar to circuit 10 in FIG. 1A, in circuit 41 references to low and high voltage values at input VINLC 55 are relative to voltages Vbat1 53 and Vbat2 54. On the other hand, references to low and high voltage values at output VOUTHC 70 are relative to voltages Vbat2 67 and Vbat3 68. Since voltages Vbat3 68 and Vbat2 67 are higher than voltages Vbat1 53 and Vbat2 54, the circuit 41 of FIG. 3 shifts the logic values at VINLC 55 to a higher voltage reference at VOUTHC 70.

The circuit 43 which provides a level shifting in the other direction (i.e., in the direction VINHC 69 to VOUTLC 70) is similar to circuit 41. Circuit 43, includes inverter 62 in device 44 (chip2) and inverters 47 and 48 in device 42 (chip1). Inverter 62 in circuit 43 corresponds to inverter 46 in circuit 41, inverter 48 in circuit 43 corresponds to inverter 60 in circuit 41 and inverter 47 in circuit 43 corresponds to inverter 61 in circuit 41. In circuit 43 references to low and high voltage values at input VINHC 69 are relative to voltages Vbat2 67 and Vbat3 68. On the other hand, references to low and high voltage values at output VOUTLC 56 are relative to voltages Vbat1 53 and Vbat2 54. Since voltages Vbat3 68 and Vbat2 67 are higher than voltages Vbat1 53 and Vbat2 54, the circuit 43 of FIG. 3 shifts the logic values at VINHC 55 to a lower voltage reference at VOUTLC 56.

In semiconductor devices input voltages, output voltages and internal signaling are typically bound by supply voltages at supply pins provided in a semiconductor circuit. This is the result of two properties of semiconductor device fabrication. Firstly, reverse biased diode circuits to both rails of the device are provided on all inputs to "clamp" inputs for which a potential may go beyond the potential of the rail, such as during the occurrence of an electrostatic discharge (ESD). The reverse biased diode circuits are provided so as to prevent device damage by electrostatic discharge. The diodes are also provided to prevent device latch-up caused by parasitic latching structures that may be inherent in the semiconductor fabrication process. Secondly, in most CMOS process all outputs typically have inherent parasitic diodes to both supplies. This is a result of a body diode of the output P-channel and N-channel devices may be allowed to go beyond the rails but at the expense of electrostatic discharge protection. Therefore, in semiconductor devices, outputs cannot extend beyond the supply due to the fact that internal parasitic diodes result in the clamping of any signals that go beyond the supply by more than a diode drop.

Because MiM capacitors, such as C1 and C4, are used in circuits 41 and 43, the output may be extended beyond the normal supply limits of the inputs since there are no parasitic devices involved. However, presence of ESD may still be an issue. ESD can be addressed from two aspects. One aspect is ESD protection before connection to other circuits (e.g. handling of a single part). The other aspect is ESD protection when a device is connected to other circuits on a printed wiring board (PWB).

For a standalone device (e.g., device 42), the diode D1 with a reverse breakdown greater than a level shifted voltage imposed by the application and less than the oxide breakdown of the MiM capacitor C1 can be used to protect the capacitor C1 against possible damage due to ESD. In an embodiment of the invention, the diode D1 can be a reverse biased Zener diode after connecting the diode to device 44 and at potential Vbat2. As discussed in the above paragraphs, one terminal of the Zener diode D1 is connected to Vbat2 rail 54 and the other terminal of the Zener diode D1 is connected to point 58 of circuit 41. The diode D1 can be selected such that the voltage breakdown of diode D1 is below the voltage breakdown of MiM capacitor C1. For example, if the breakdown of capacitor C1 is greater than 20V, the diode D1 can be selected with a voltage breakdown of 7V to 9V. The diode D1 provides protection to the capacitor C1 when the voltage at point 58 exceeds Vbat2 up to the sum of Vbat2 and voltage breakdown (e.g., 7 to 9 volts).

The device 42 is connected to device 44 which provides the DC restoration. A pair of diodes D3 and D4 are provided for ESD protection. One terminal of diode D3 is connected at Vbat3 rail 68 and the other terminal of diode D3 is connected to point 58. One terminal of diode D4 is connected to Vbat2 rail 67 and the other electrode of diode D4 is connected to point 58. If the voltage at point 58 is greater than the Vbat3 voltage, the diode D3 conducts and thus protects components of device 44. If the voltage at point 58 is lower than Vbat2, the diode D4 conducts, hence shunting the device 44. This also provides protection to components of device 44.

The above description with respect to ESD protection is provided with respect to circuit 41 which includes inverters 46, 60 and 61. A similar protection scheme may also be provided for the circuit 43 which provides level shifting in the opposite direction. Therefore, diodes may also be provided in the counterpart level shifting direction. For example, diode D2 which operate in the same manner as diode D1 can be included. Diodes D5 and D6 which operate in the same manner as diodes D3 and D4 can also be included. Specifically, the diode D2 can be selected such that the voltage breakdown of diode D2 is below the voltage breakdown of MiM capacitor C4. For example, if the breakdown of capacitor C4 is greater than 20V, the diode D2 can be selected with a voltage breakdown of 7V to 9V. The diode D2 provides protection to the capacitor C4 when the voltage at point 73 exceeds Vbat2 up to the sum of Vbat2 and voltage breakdown (e.g, 7 to 9 volts). In addition, if the voltage at point 73 is greater than the Vbat2 voltage, the diode D5 conducts and thus protects components of the device 42. If the voltage at point 73 is lower than Vbat1, the diode D6 conducts, hence shunting the device 42. This also provides protection to components of device 42.

Another aspect of an embodiment of the present invention is the ability to provide a deglitching filter at an output of the source/buffer circuit (e.g., inverter 46) if desired. If, for example, noise is present in the power supply (e.g., Vbat3) used for the receiving latch circuit (e.g., inverters 60 and 61), the noise has a minimum effect on the buffer output, i.e., the output of source circuit (inverter 46). However, if noise is present between "two substrates" (e.g., P-substrate and deep N-well), a simple digital deglitching filter may be added to the output of the buffer to provide a bandpass conditioned signal assuring that substantially only the signal of interest is observed by the receiving processing circuits.

Figure 4A:
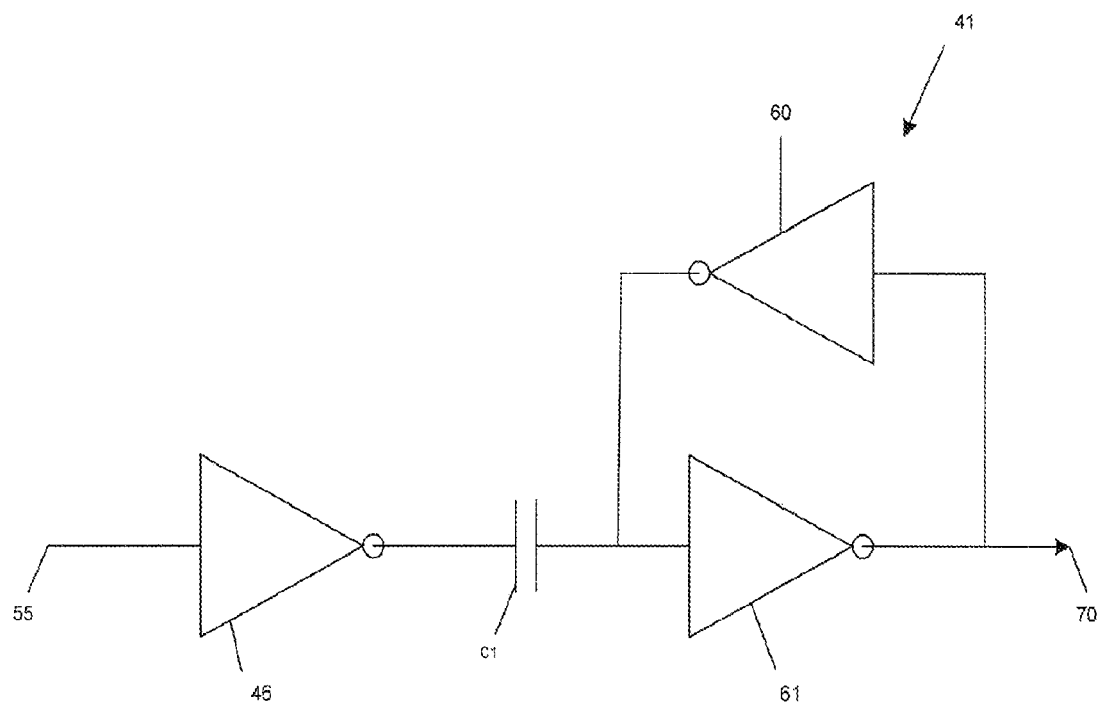
FIGS. 4A and 4B are simplified logic circuits schematics of circuits depicted in FIG. 3.
Figure 4B:
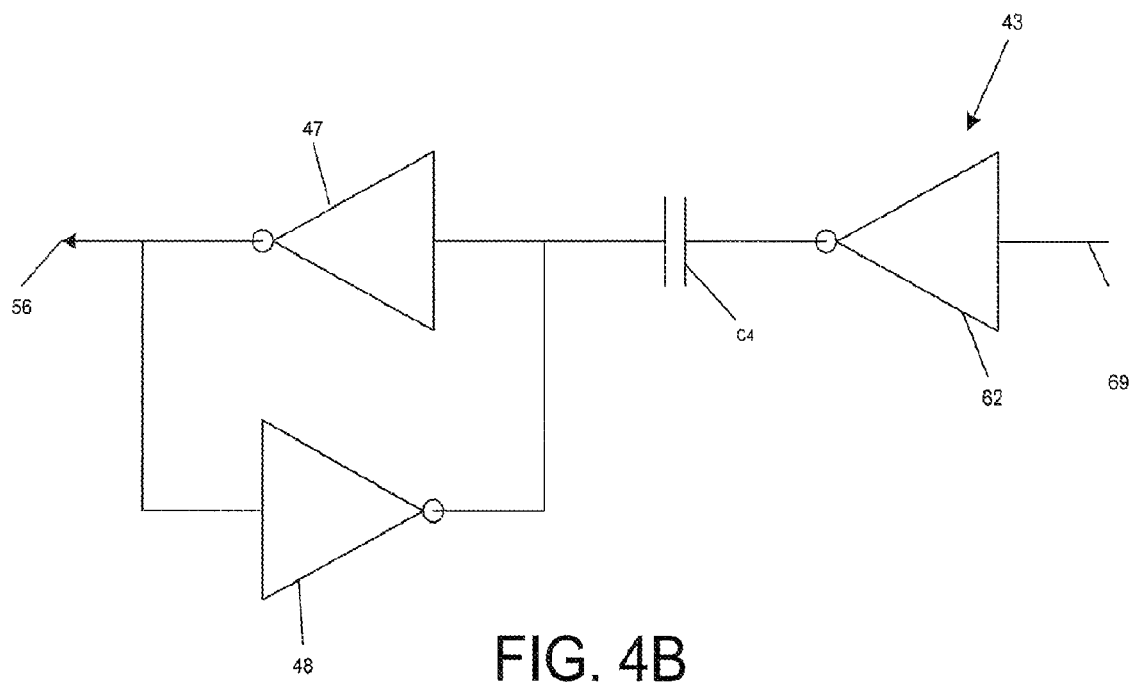

FIGS. 4A and 4B are simplified logic circuits schematics of circuits 41 and 43 depicted in FIG. 3, respectively. As shown in FIG. 4A, in circuit 41, the output of inverter 46 is connected to MiM capacitor C1 which is in turn connected to input of inverter 61 and output of inverter 60. The inverters 60 and 61 are configured such that the output of inverter 61 is connected to input of inverter 60 and output of inverter 60 is connected to input of inverter 61. A driving signal is input at input 55 and a signal is output at output 70. The inverters 46 and 61 in circuit 41 are configured to drive strong while the inverter 60 in circuit 41 is configured to drive weak and slow. As stated above the capacitor C1 passes only transitions. When the drive signal becomes low, the inverter 46 outputs a high signal which is transmitted directly to inverter 61 by overcoming the slow drive of inverter 60. Hence, the high input at inverter 61 is output by the inverter 61 as a low signal. The low signal is input to inverter 60 which outputs a high signal. The high signal output by inverter 60 latches or reinforces the high signal input to inverter 61. Similarly, when the drive signal becomes high, the inverter 46 outputs a low signal which is transmitted directly to inverter 61 by overcoming the slow drive of inverter 60. Hence, the low signal input at inverter 61 is output by the inverter 61 as a high signal. The high signal is input to inverter 60 which outputs a low signal. The low signal output by inverter 60 latches or reinforces the low signal input to inverter 61.

As shown in FIG. 4B, in circuit 43, the output of inverter 62 is connected to MiM capacitor C4 which is in turn connected to input of inverter 47 and output of inverter 48. The inverters 47 and 48 are configured such that the output of inverter 48 is connected to input of inverter 47 and output of inverter 47 is connected to input of inverter 48. A driving signal is input at input 69 and a signal is output at output 56. The various power supplies are not depicted in FIGS. 4A and 4B for simplification reasons. However, it must be appreciated that using, for example, the power supply scheme depicted in FIG. 3, power lines and power pads can be added in FIGS. 4A and 4B. Circuit 43 in FIG. 4B operates in the same fashion as circuit 41 in FIG. 4A, except in the opposite direction.

Figure 5:
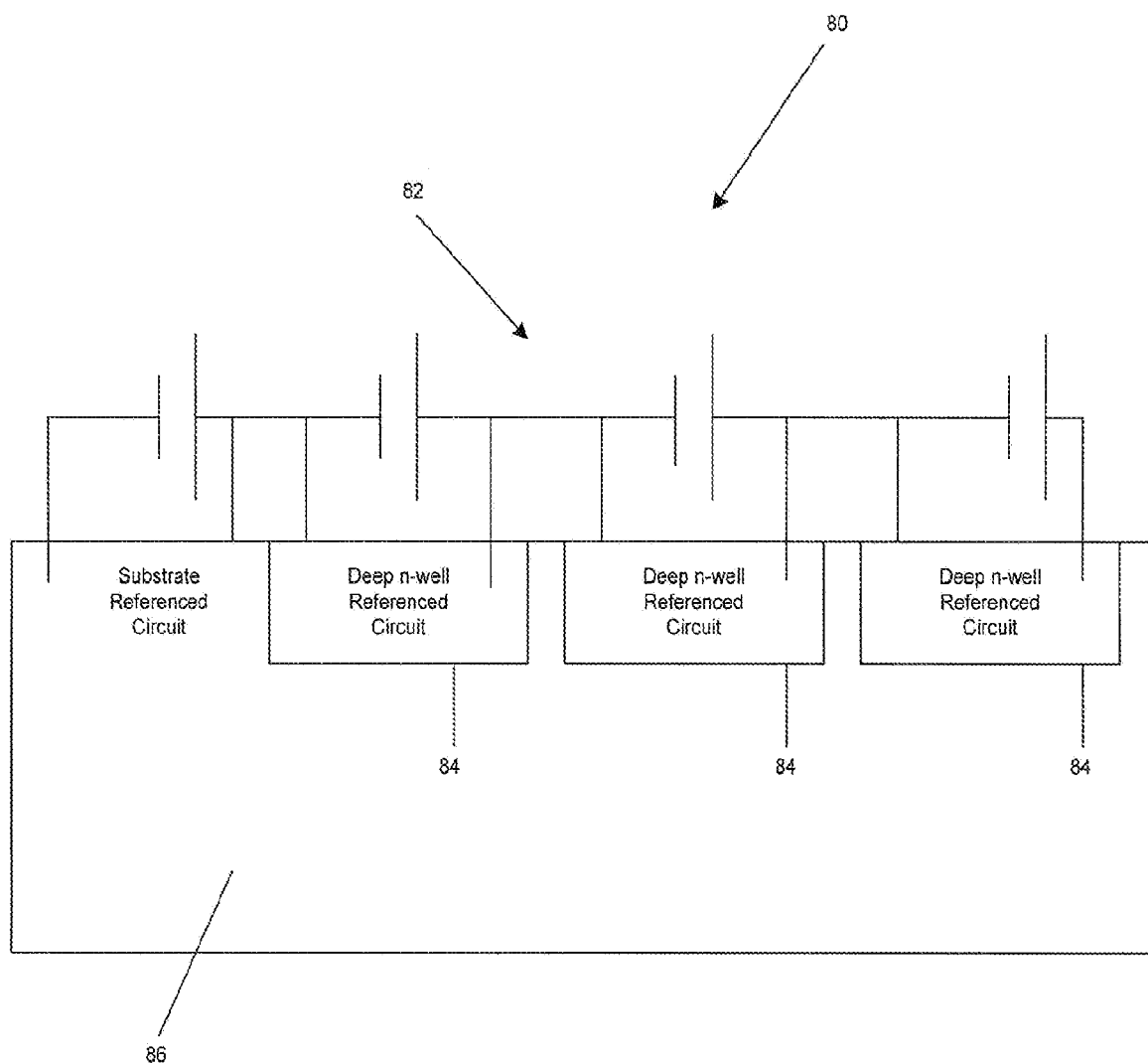
FIG. 5 depicts a topology of using latching DC restoration in multiple substrate isolation circuits, according to an embodiment of the present invention.

FIG. 5 depicts a topology of using latching DC restoration in multiple substrate isolation circuits, according to an embodiment of the present invention. With the topology 80, successive source and latching DC restoration circuits 82 can be provided between a plurality of deep N-well substrate diffusion regions 84. Each deep N-well region 84 is isolated from another deep N-well region 84 by a junction isolation provided by each N-well 84 to substrate 86 connection. The topology 80 is similar to the topology depicted in FIG. 2 but the topology 80 is extended to a plurality of latching DC restoration circuits instead of one latching circuit.

Figure 6A:
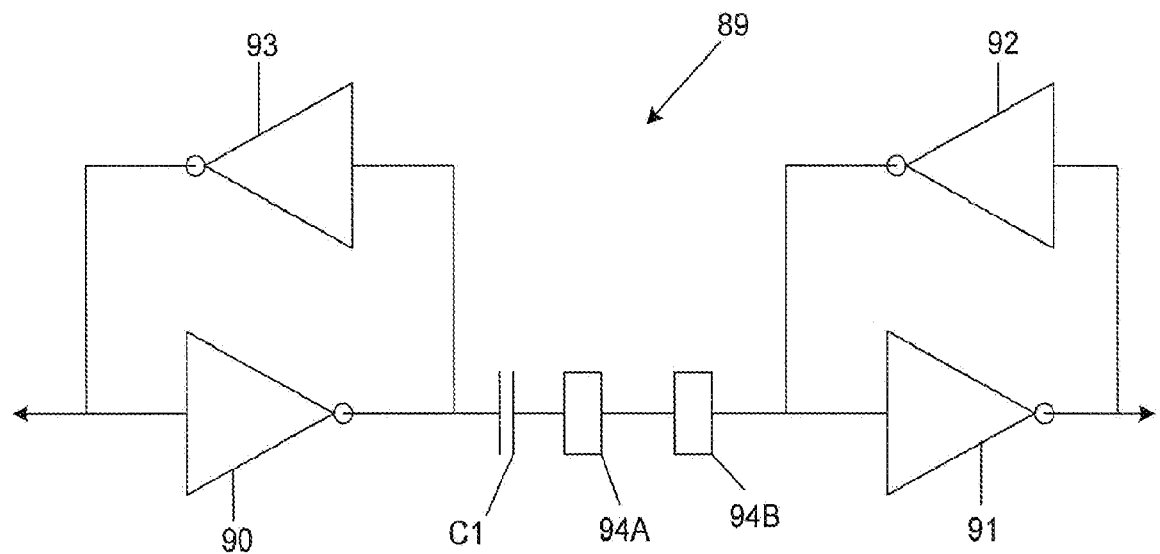
FIGS. 6A and 6B are simplified logic circuit schematics of a latching DC restore circuit, according to another embodiment of the present invention.
Figure 6B:
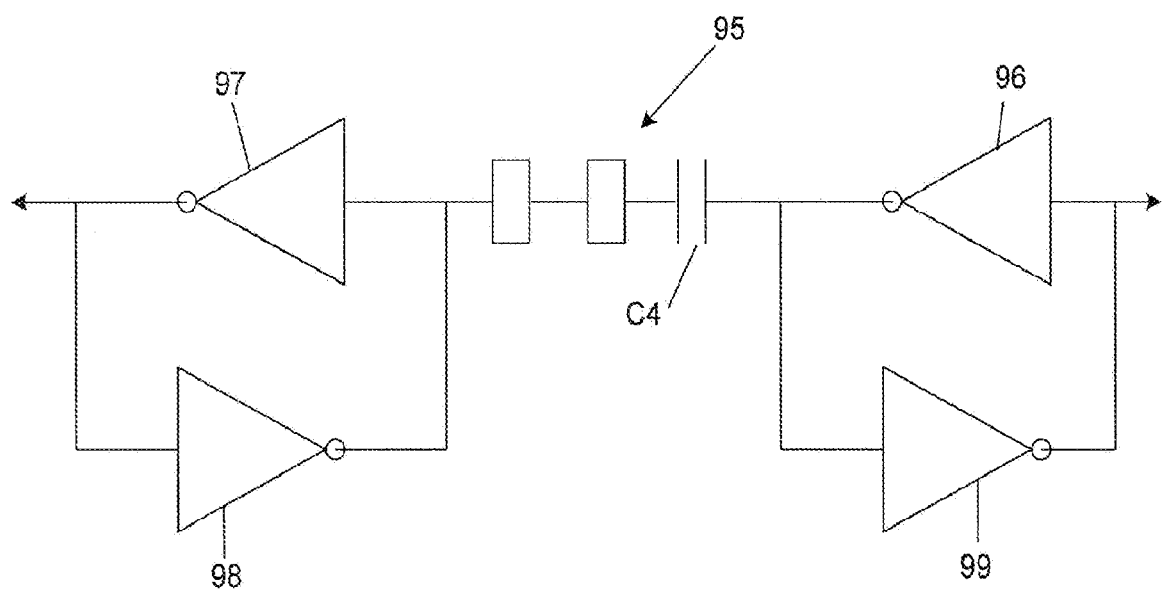

FIGS. 6A and 6B are simplified logic circuit schematics of a latching DC restore circuit, according to another embodiment of the present invention. FIG. 6A shows latching circuit 89. Latching circuit 89 is in many ways similar to latching circuit 41 shown in FIG. 4A. Indeed, latching circuit 89 comprises source inverter 90 and latching inverters 91 and 92. Source inverter 90 in circuit 89 correspond to inverter 46 in circuit 41 and latching inverters 91 and 92 in circuit 89 correspond to inverters 61 and 60 in circuit 41. However, latching circuit 89 comprises an additional inverter 93. The input of inverter 93 is connected to the output of inverter 90 and the output of inverter 93 is connected to the input of inverter 90. Similarly to circuit 41 in FIG. 4A, circuit 89 comprises a MiM capacitor C1 connected between an output of inverter 90 (which is also connected to the input of inverter 93) and input of inverter 91 (which is connected to the output of inverter 92). Elements 94A and 94B are pads provided in the circuit of the chip for making various connections. As described in the above paragraphs, the circuit 41 which includes inverters 46, 60 and 61, provides level shifting in one direction, i.e., unidirectional level shifting. The presence of inverter 93 extends the DC restore circuit to provide level shifting in both directions, i.e., bidirectional level shifting.

For example, when a drive voltage applied at the input of inverter 90 becomes low, a high voltage is obtained at output of the inverter 90. The high voltage obtained at the output of inverter 90 is transferred both to the input of inverter 93 and to the input of inverter 91. As a result a low voltage is obtained at output of inverter 91. Because the output of inverter 91 and input of inverter 92 are connected, the voltage obtained at output of inverter 91 is input to inverter 92. As a result, a high voltage is obtained at the output of inverter 92. Since output of inverter 92 and input of inverter 91 are connected, the high voltage obtained at the output of inverter 92 reinforces or latches the high voltage input to inverter 91. A same analysis can be performed when a high drive voltage is applied at the input of inverter 90.

When a drive voltage applied at the input of inverter 92 becomes low, a high voltage is obtained at output of the inverter 92. The high voltage obtained at the output of inverter 92 is transferred both to the input of inverter 93 and to the input of inverter 91. As a result a low voltage is obtained at output of inverter 93. Because the output of inverter 93 and input of inverter 90 are connected, the voltage obtained at output of inverter 93 is input to inverter 90. As a result, a high voltage is obtained at the output of inverter 90. Since output of inverter 92 and input of inverter 90 are connected, the high voltage obtained at the output of inverter 90 reinforces or latches the high voltage output by inverter 92 and input to inverter 93. Hence, circuit 89 provides bidirectional level shifting.

FIG. 6B shows latching circuit 95. Latching circuit 95 is similar to latching circuit 89 shown in FIG. 6A. Indeed, latching circuit 95 comprises latching inverters 97 and 98 and latching inverters 96 and 99. Circuit 95 comprises a MiM capacitor C4 connected between an output of inverter 96 (which is also connected to the input of inverter 99) and input of inverter 97 (which is also connected to the output of inverter 98). The presence of inverter 99 allows to extend the use of a DC restore circuit to provide level shifting in both directions, i.e., bidirectional level shifting. Latching circuit 95 operates in the same way as circuit 89 described in the above paragraphs.

Figure 7:
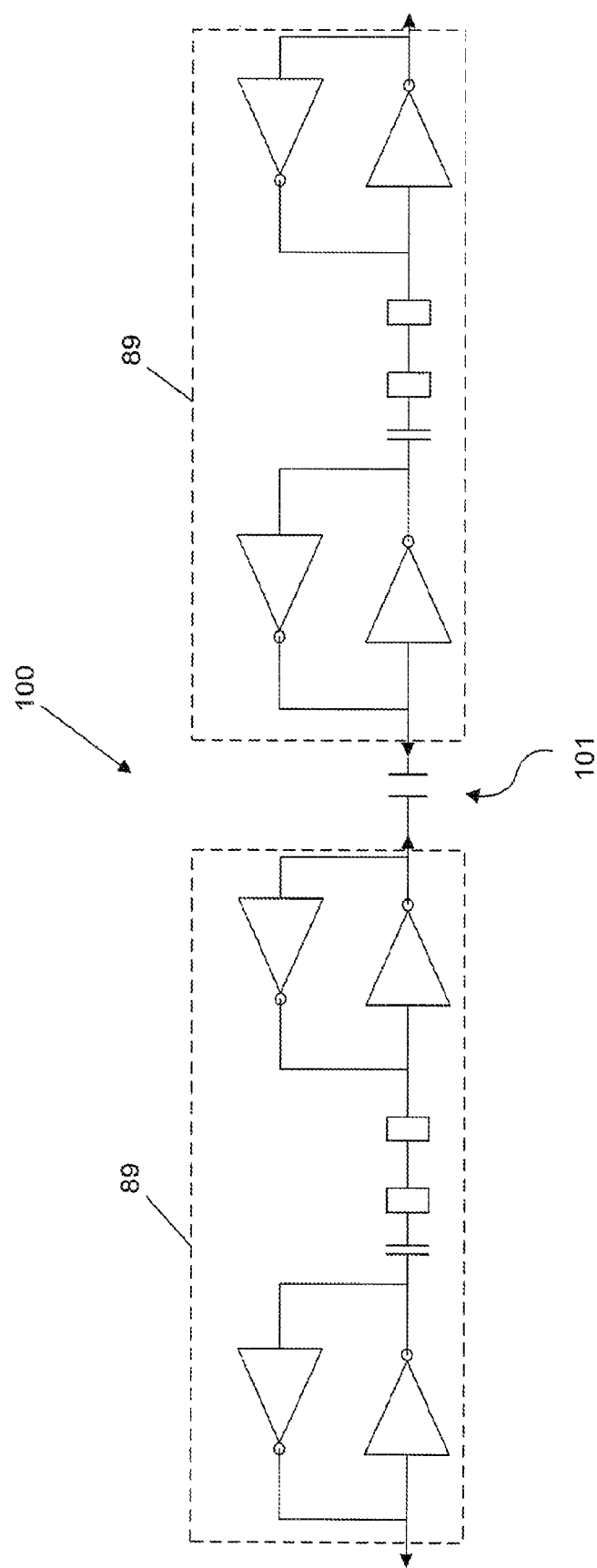
FIG. 7 depicts a circuit comprising a plurality of level shifting circuits connected in series, according to an embodiment of the present invention.

FIG. 7 depicts a circuit 100 comprising a plurality of level shifting circuits 89 connected in series, according to an embodiment of the present invention. The circuits 89 depicted in FIG. 6A are arranged in series with a MiM capacitor 101 provided between two adjacent circuits 89. In an alternative embodiment, circuit 95 shown in FIG. 6B can be used instead of circuit 89. In this case, circuit 100 includes a plurality of level shifting circuits 95 connected in series.

Figure 8:
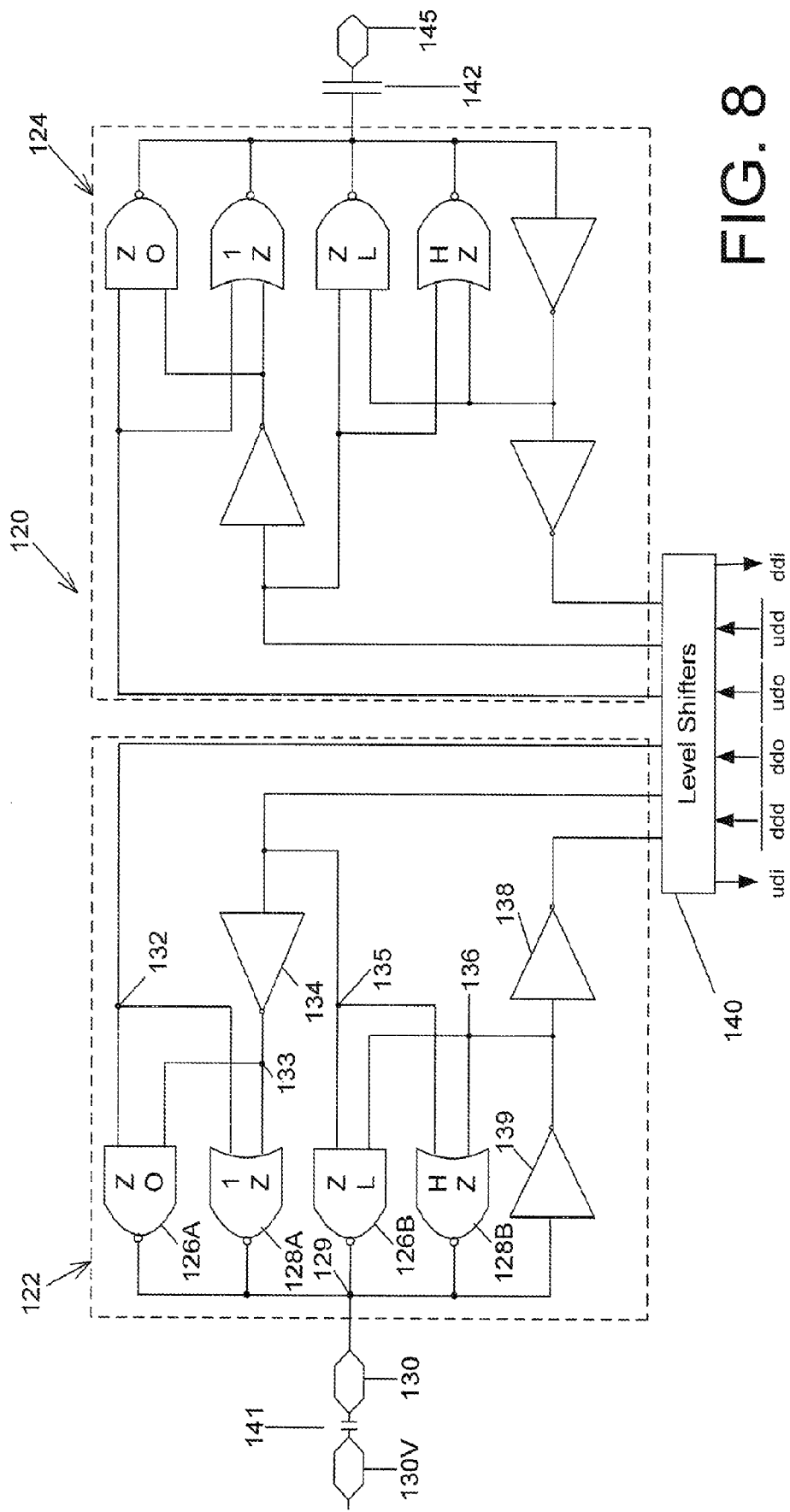
FIG. 8 shows a V-bus cell utilizing level shifters in FIGS. 1-7, according to an embodiment of the present invention.

FIG. 8 shows a V-bus cell 120 utilizing level shifters described above, according to an embodiment of the present invention. The term V-bus is used hereinafter to refer to the industry recognized terminology "bidirectional single line communication interface". V-bus cell 120 can be connected, through ports 130 and 145 to other cells 120 along the V-bus.

The V-bus cell 120 comprises a first level circuit 122 and a second level circuit 124. First level circuit 122 comprises NAND gates 126A and 126B and NOR gates 128A and 128B. Outputs of all the NAND gates and NOR gates are connected to a common electrical point 129 which in turn is connected to pad port 130. Inputs of NAND gate 126A are connected to inputs of NOR gate 128A. Inputs of NAND gate 126B are connected to inputs of NOR gate 128B. One common point 132 connected to a first input of NAND gate 126A and to a first input of NOR gate 128A is connected to level shifters 140. One common point 133 connected to a second input of NAND gate 126A and to a second input of NOR gate 128 is connected to output of inverter 134. The input of inverter 134 is connected to level shifters 140. One common point 135 connected to a first input of NAND gate 126B and to a first input of NOR gate 128B is connected to input of inverter 134. One common point 136 connected to a second input of NAND gate 126B and to a second input of NOR gate 126B is connected to input of inverter 138 and to output of inverter 139. The output of inverter 138 is in turn connected to level shifters 140. In addition, input of inverter 139 is connected to point 129 and hence to pad port 130.

The second level circuit 124 has a similar configuration as that of the first level circuit 122. The second level circuit 124 comprises similar NAND and NOR gates which are connected to each other and to various inverters and level shifters 140 in the same way as described above in the case of the first level circuit 122. However, the second level circuit 124 is connected to pad port 145 via capacitor 142. The capacitor 142 can either be placed outside the second level circuit 124 as depicted herein or incorporated inside the second level circuit 124.

Level circuits 122 and 124 can operate at different voltages. For example, level circuit 124 can be disposed in a deep N-well region of the same chip as level circuit 122 and operate at a higher voltage. Level shifters 140 include circuitry such as illustrated in FIGS. 1-7 to shift the logic values to and from level circuit 124 to the substrate voltage of level circuit 122.

In FIG. 8, the logic elements, i.e the NAND and NOR gates are labeled with drive strengths of their respective "logic-true" and "logic-false" output conditions using the following conditions: the label "Z" stands for effectively open circuit, the label "1" stands for a drive with a low impedance (or strong drive) to a positive power supply, the label "0" stands for a drive with low impedance (or strong drive) to a negative power supply, the label "H" stands for a drive with high impedance (or weak drive) to the positive power supply, and the label "L" stands for a drive with high impedance (or weak drive) to the negative supply. The upper label in each logic element defines the "true-logic" state and the lower label in each logic element defines the "false-logic" state.

The level shifters 140 include a series of inputs and outputs. Specifically, the level shifters 140 include upstream data input (udi), downstream data delayed (ddd), downstream data output (ddo), upstream data output (udo), upstream data delayed (udd), and downstream data input (ddi).

In the following paragraphs the operation of the V-bus 120 will be described in detail. The operation may be best understood by dividing the operation into four dynamic operational states. The four dynamic operational states are: (1) initial output high being driven to low from internal logic; (2) initial output low being driven to high from internal logic; (3) initial output high being driven to low from the V-bus; (4) initial output low being driven to high from the V-bus. The operation of the four dynamic operational states are summarized in Tables 1-4.

TABLE 1

| | 126a | 126b | 128a | 128b | 136 | 130 |
|---|---|---|---|---|---|---|
| ddo = 0<br>ddd = 0 | Z | Z | Z | H | 0 | H |
| ddo = 1<br>ddd = 0 | 0 | Z | Z | Z | 1 | 0 |
| ddo = 1<br>ddd = 1 | Z | L | Z | Z | 1 | L |

TABLE 2

| | 126a | 126b | 128a | 128b | 136 | 130 |
|---|---|---|---|---|---|---|
| ddo = 1<br>ddd = 1 | Z | L | Z | Z | 1 | L |
| ddo = 0<br>ddd = 1 | Z | Z | 1 | Z | 0 | 1 |
| ddo = 0<br>ddd = 0 | Z | Z | Z | H | 0 | H |

TABLE 3

| | 126a | 126b | 128a | 128b | 136 | 130 Drive |
|---|---|---|---|---|---|---|
| 130 V = H<br>ddo = 0<br>ddd = 0 | Z | Z | Z | H | 0 | H |
| 130 V = 0<br>ddo = 0<br>ddd = 0 | Z | Z | Z | Z | 1 | Z |
| 130 V = L<br>ddo = 1<br>ddd = 0 | 0 | Z | Z | Z | 1 | 0 |
| 130 V = L<br>ddo = 1<br>ddd = 1 | Z | L | Z | Z | 1 | L |

TABLE 4

| | 126a | 126b | 128a | 128b | 136 | 130 Drive |
|---|---|---|---|---|---|---|
| 130 V = L<br>ddo = 1<br>ddd = 1 | Z | L | Z | Z | 1 | L |
| 130 V = 1<br>ddo = 1<br>ddd = 1 | Z | Z | Z | Z | 0 | Z |
| 130 V = H<br>ddo = 0<br>ddd = 1 | Z | Z | 1 | Z | 0 | 1 |
| 130 V = H<br>ddo = 0<br>ddd = 0 | Z | Z | Z | H | 0 | H |

As shown in Table 1, if ddo and ddd are low, i.e., ddo and ddd are equal to "0", the top NAND gate (NAND gate 126A) in first level circuit 122 will be true and therefore drive to a logic Z state. Similarly, if udo and udd are low, i.e., udo and udd are equal to "0", the top NAND gate in the second level circuit 124 will also be true and therefore drive to a logic Z state. Specifically, in the case of the first level circuit 122, if ddd and ddo are low (i.e., equal to 0), connection point 132 is low and connection point 135 is low which results in a high at point 133 after inversion by inverter 134. Consequently, one input of NAND gate 126A is low and another input of NAND gate 126A is high. The result at the output of NAND gate 126A (i.e., port 130) is true and since the true state of NAND gate 126A is Z state, the output of NAND gate 126A is driven to a logic Z state (i.e., open state).

Similarly, the upper NOR gate (NOR gate 128A) of the first level circuit 122 will be false and thus drive at a logic Z state as well. In the same way, if udo and udd are low, i.e., udo and udd are equal to "0", the upper NOR gate of the second level circuit 124 will also be false and drive at a logic Z state. Specifically, in the case of the first level circuit 122, if ddd and ddo are low (i.e., equal to 0), connection point 132 is low and connection point 135 is low which results in a high at point 133 after inversion by inverter 134. Consequently, one input of NOR gate 128A is low and another input of NOR gate 128A is high. The result at the output of NOR gate 128A (i.e., port 130) is false and since the false state of NOR gate 128A is a Z state, the output of NOR gate 128A is also driven to a logic Z state (i.e., open state).

The lower NAND gate (NAND gate 126B) of the first level circuit 122 will be true and therefore drive a logic Z state. Similarly, the lower NAND gate of the second level circuit 124 will also be true and therefore drive a logic Z state. Specifically, in the case of the first level circuit 122, if ddd is low and the port 130 is initially high, connection point 135 is low and connection point 136 is low, after the low signal at port 130 is inverted to high by inverter 139. Consequently, both inputs of NAND gate 126B are low. The result at the output of NAND gate 126B (i.e., port 130) is true and since the true state of NAND gate 126B is a Z state, the output of NAND gate 126B is also driven to a logic Z state (i.e., open state).

The output of lower NOR gate (NOR gate 128B) of level circuit 122 and the lower NOR gate of the level circuit 124 will be low and thus drive port 130 with a H logic state. Specifically, if ddd is low and the port 130 is initially high, connection point 135 is low and connection point 136 is low, after the low signal at port 130 is inverted to high by inverter 139. Consequently, one input of NOR gate 128B is low and another input of NOR gate 128B is low. The result at the output of NOR gate 128B (i.e., port 130) is true and since the true state of NOR gate 128B is a H state, the output of NOR gate 128B is driven to a logic H state.

As a result, the NAND gates 126A and 126B and the NOR gate 128A drive to an open state, whereas the NOR gate 128B drive to H state, meaning that no change occurred to the port 130 which initially was a H state, as shown in Table 1. The H logic state on port 130 is maintained until either of two events occurs, a change in data from the internal control logic (for example, ddo becomes equal to 1), or a change in data from the bus to which port 130 is connected, as shown, for example, in Table 3.

When the internal logic needs to change the state of port 130 and/or port 145 of cell 120 to a low value as a result of inputs from circuitry connected to the internal logic, the internal logic changes the downstream data output ddo or upstream data output udo to a high level (i.e., ddo is equal to 1 as shown in Table 1) while leaving the corresponding delayed outputs at their previous low levels (i.e., ddd is equal to 0 as shown in Table 1). As a result, the output of the top NAND gate (NAND gate 126A) in level circuit 122 and/or the top NAND gate in level circuit 124 drive a 0 state onto port 130 and/or port 145 overriding any opposing H states. Specifically, if ddo changes to a high level and ddd is left at its low value, connection point 132 is now changed to high and connection point 135 is low which results in a high at point 133 after inversion by inverter 134. Consequently, both inputs of NAND gate 126A are high. The result at the output of NAND gate 126A (i.e., port 130) is false and since the false state of NAND gate 126A is a 0 state, the output of NAND gate 126A is also driven to a logic 0 state which overrides the initial H state of the V-bus at port 130, as shown in Table 1. A similar applies to level circuit 124 to drive port 145 to a logic 0.

After a period of time delay greater than or equal to a transition time of the logic (e.g., logic clock in the circuit or the controller), the downstream delayed data ddd and upstream delayed data udd are switched to a true state as well (i.e., ddo and ddd are both equal to 1 as shown in Table 1). As a result the output drive strengths of ports 130 and/or 145 are switched to an L (or weak drive low) strength. This permits other cells on the bus to drive the bus network back high if desired. The time delay can be controlled with an RC circuit or may be a synchronous delay relative to the clock in the circuit or the controller. Table 1 summarizes the states in the level circuit 122 at different points in time as the state of the V-bus is changed from H to L when controlled by ddo and ddd. A similar table can be constructed for the counterpart level circuit 124.

In the above paragraphs, a detailed operation of the state of the V-bus is described with reference to Table 1 which is constructed in the case where the initial state of port 130 is a H state and the change from H to L is caused by a change in the states of ddd and/or ddo. A similar detailed operation can be performed for Table 2. In Table 2, the initial state of port 130 is L state and the change from L to H is caused by a change in the states of ddd and/or ddo.

If a signal change from the bus is detected at port 130, that change passes through inverters 139 and 138, as well as level shifters 140 as upstream data input (udi). If the port 130 had been low, and becomes high, connection point 136 becomes low. When the ddo and ddd connection points are driven low, the output of NAND gate 126B assumes the Z (open) state and the output of NOR gate 128B assumes the H state consistent with port 130.

Tables 3 and 4 summarize the transition sequencing as V-bus data switches from H to L and from L to H, respectively. Table 3 shows the operating sequence when the initial state of port 130 (i.e., state of 130 Drive) is a H state and changes from H to L by driving the V-bus to 0 (i.e., 130V is equal to 0) and by changing the ddo state from 0 to 1. Table 4 shows the operating sequence when the initial state of port 130 (i.e., state of 130 Drive) is a L state and changes from L to H by driving the V-bus to 1 (i.e., 130V is equal to 1) and by changing the ddo state from 1 to 0. In one embodiment, the ddo is coupled to or follows udi. Therefore, the ddo state change from 0 to 1 or from 1 to 0 is caused by a change in the state of udi, that is ddo assumes the state of udi. The notation 130 Drive represents the output at port 130 of the V-bus cell 122 and the notation 130V represents the output of the V-bus cell 122 at point 130V after capacitor 141.

V-bus cell 124 operates in the same fashion as V-bus cell 122. When V-bus cell 122 is driven from the bus 130, V-bus cell 124 will be driven from the internal control logic and level shifters 140. Similarly, when V-bus cell 124 is driven from the bus 145, V-bus cell 122 will be driven from the internal control logic and level shifters 140. However, V-bus cells 122 and 124, may both be controlled by the internal logic.

If a signal change from the bus is detected at port 145, the capacitor 142 'bootstraps' the logic change to the logic of level circuit 124. Since a steady state condition of the logic network is L or H, an incoming 1 or 0 would override and start to charge/discharge the capacitor 142. However, as soon as a transition is initiated/detected, the logic elements of level circuit 124 transition to a Z state (open state), thus preventing additional charge transfer in the capacitor. Once the transition has reached a valid logic level, the logic networks drive themselves to a logic level so as to reinforce the incoming logic and signal the control logic that a change has occurred, as described above with respect to level circuit 122. When the control logic detects a transition at port 130 or port 145, it will signal the data in the other cell so as to match the signal condition received from the other side of the bus. Thus, the states of ports 130 and 145 of level circuits 122 and 124 follow each other as if they were connected (thus the use of the term virtual bus or V-bus).

Note also that the control logic has the capability of inhibiting data from propagating by not reflecting data changes on the idle bus. This allows for communication to an upstream node for example for address assignment without propagating the same commands downstream. This is useful in that a network may be built from nodes with the same (or no) address and have addresses assigned according to connection order.

In one embodiment, instead of controlling the state of downstream data output ddo and upstream data output udo via a logic clock, the state of downstream data output ddo and the state of upstream data output udo can be controlled, respectively, by the state of the downstream data input ddi and the state of upstream data input udi. For example, this can be done by connecting ddo to ddi and connecting udo to udi.

Figure 9:
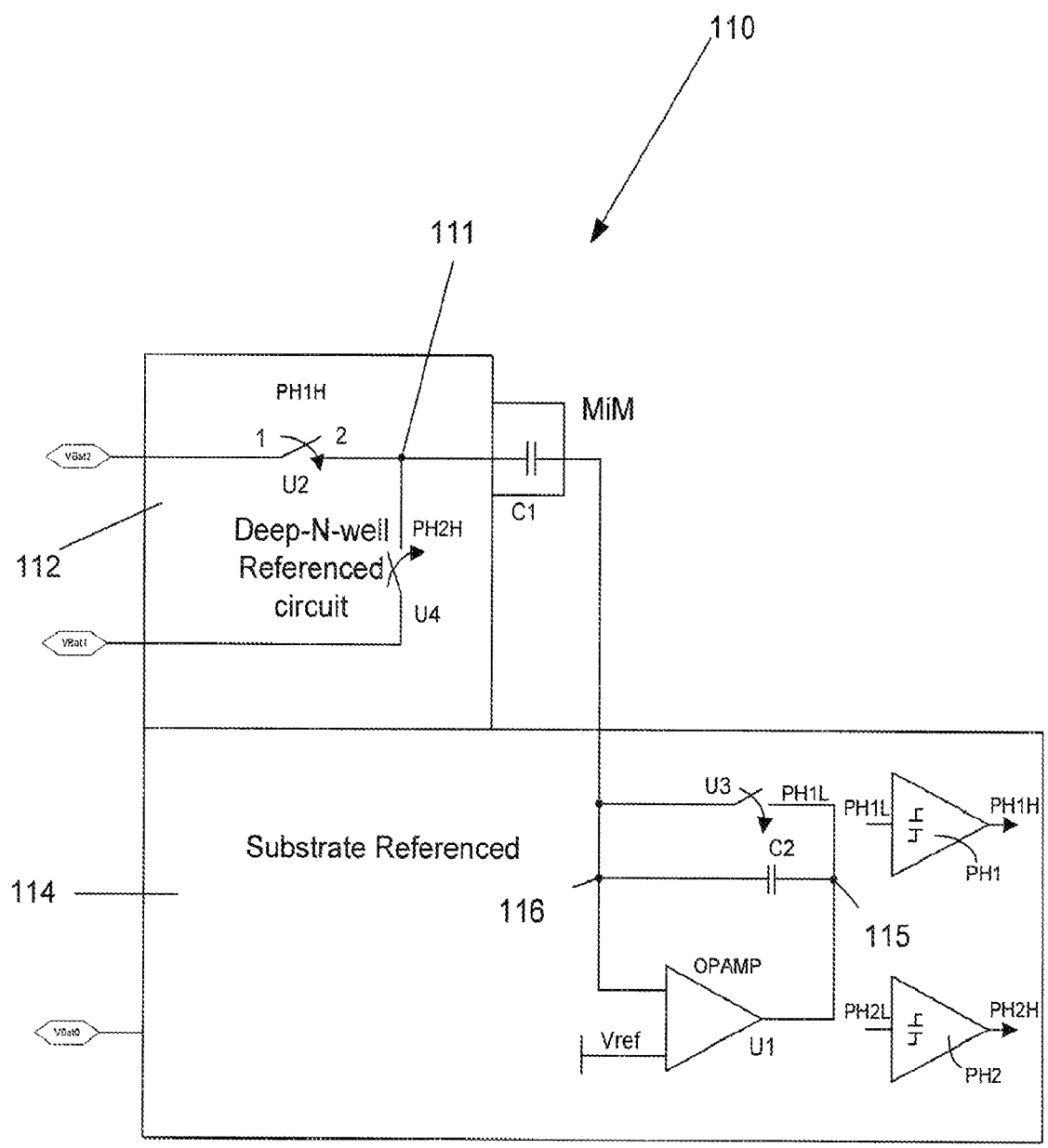
FIG. 9 shows a circuit for analog level shifting and isolation using isolated latching DC restoration isolation level shifting, according to an embodiment of the present invention.

FIG. 9 shows a circuit 110 for analog level shifting and isolation using isolated latching DC restoration isolation level shifting, according to an embodiment of the present invention. The circuit 110 comprises analog switches PH1H and PH2H in deep N-well substrate isolation area 112. The two switches PH1H and PH2H are connected to one terminal 111 of MiM capacitor C1. The switch PH1H is also connected to power supply Vbat2 and the switch PH2H is connected to power supply Vbat1. The MiM capacitor C1 is connected in a standard switched capacitor gain circuit configuration. The standard configuration uses a phased clock on the switch control inputs to control the switches. The circuit 110 further comprises analog switches PH1L, capacitor C2 and operational amplifier OPAMP. The analog switch PH1L, capacitor C2 and amplifier OPAMP are in the substrate referenced area 114. The output of the operational amplifier is connected to the capacitor C2 and to the switch PH1L, at 115. One input of operational amplifier OPAMP is connected to one terminal 116 of MiM capacitor C1 and another input of operational amplifier OPAMP is connected to a voltage point node Vref. Similarly, the switch PH1L is connected to connection point 116 common to one end of capacitor C1, one end of capacitor C2 and one input of Operational amplifier OPAMP.

In operation, if switch PH1L is closed, i.e. C2 and the OPAMP are short circuited, PH1H is open, PH2H is closed and the node is at Vref, the voltage at point 116 is at about Vref and the voltage at point 111 is at about Vbat1. Hence, the MiM capacitor C1 charges from Vref up to Vbat1. When the switch PH1L is open, switch PH2H is opened and PH1H is closed, the voltage at point 111 is about Vbat2. Therefore, the change in charge in capacitor C1 is proportional to a difference between Vbat1 and Vbat2 (i.e., proportional to Vbat2−Vbat1). Specifically, the voltage at point 116 is proportional to Vbat2−Vbat1 at the substrate referenced potential. The difference in charge in capacitor C1 is transferred to capacitor C2. Hence, the voltage across capacitor C2 is proportional to the charge that is transferred, which is proportional to the difference between Vbat1 and Vbat2 (i.e., proportional to Vbat2−Vbat1), and to a ratio between capacitors C1 and C2. Since voltage across capacitor C2 is also proportional to the ratio between capacitors C1 and C2, matching the capacitors C1 and C2 may be needed to avoid potential errors. The switches PH1H, PH2H and PH1L are controlled by level shifters PH1 and PH2. For example, the approach described in the previous embodiments, depicted for example in FIGS. 1 and 3, can be used as level shifters to control switches PH1H, PH2H and PH1L.

Although, the circuit 110 is described using two switches PH1H and PH2H for preconditioning the MiM capacitor C1, it must be appreciated that one switch may be used instead of two switches. For example, switch PH2H can be eliminated by connecting directly Vbat1 to end point 111 of C1. In this case, when the switch PH1H is open, a voltage Vbat1 is applied to capacitor C1, and when Vbat2 is closed, a voltage Vbat2 is applied to the capacitor C1. As a result, the change in charge in capacitor C1 is proportional to a difference between Vbat1 and Vbat2 (i.e., Vbat2−Vbat1), as described above. However, in order to transfer substantially efficiently the full voltage Vbat2 to capacitor C1, the power supply Vbat2 is selected to have a sufficiently high impedance so as to avoid current losses or leaks due to the presence of voltage Vbat1 at point 111.

Figure 10:
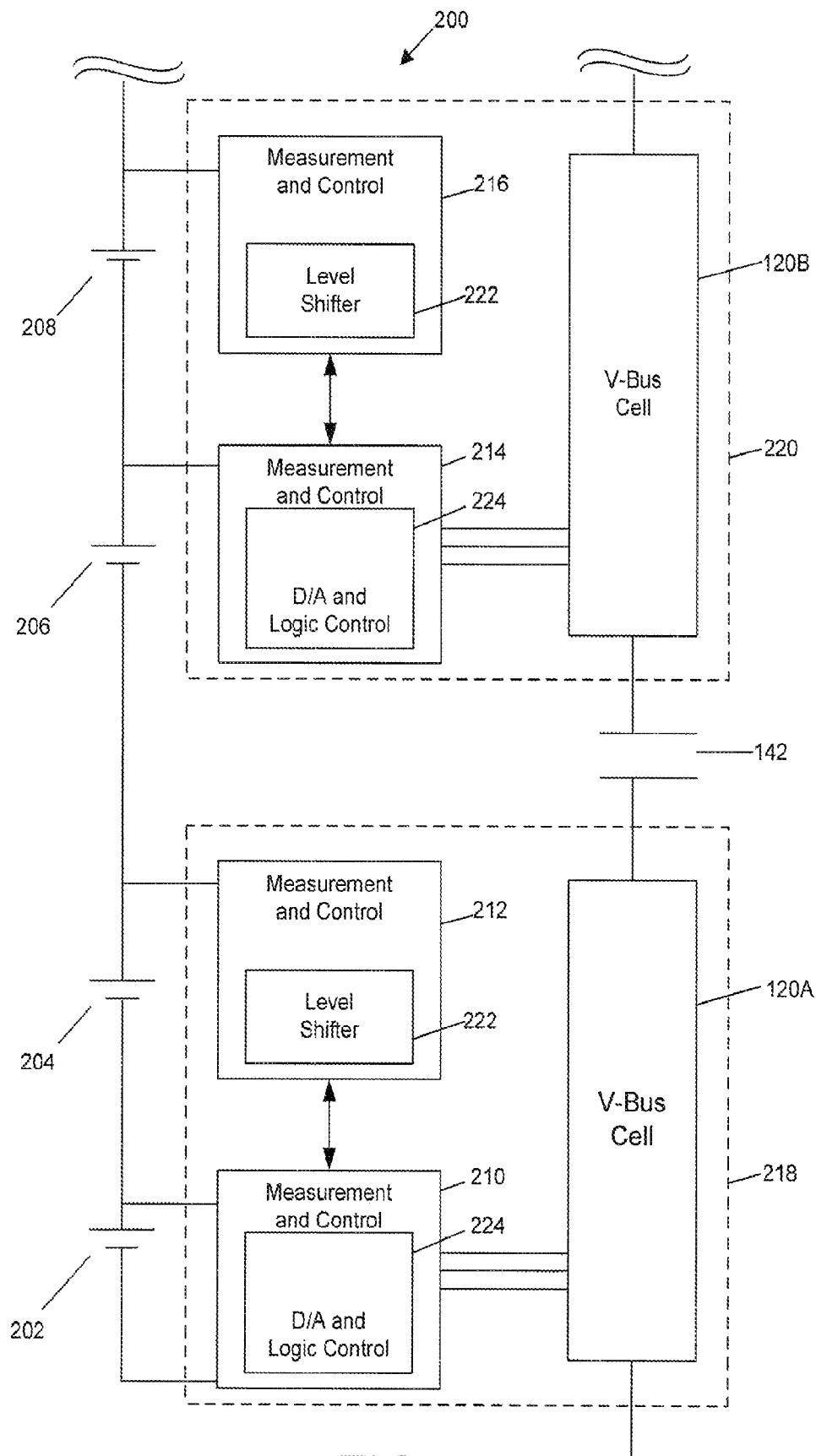
FIG. 10 shows an implementation of a V-bus, according to an embodiment of the present invention.

FIG. 10 shows an implementation 200 of a V-bus, according to an embodiment of the present invention. In FIG. 10, the V-bus is employed to monitor and control a string of batteries 202, 204, 206 and 208. Measurement and control circuits 210-216 monitor and control batteries 202-208, respectively. Measurement and control circuits 210 and 212 operate in different voltage ranges based on batteries 202 and 204, but can be provided on the same chip 218 based on the technology described herein. Thus, measurement and control circuit 212 is disposed in a deep N-well portion of chip 218 while measurement and control circuit 210 is disposed in the substrate of chip 218. Digital signals can pass back and forth between measurement and control circuits 210 and 212 using the arrangements illustrated in FIGS. 1-7. Analog signals can pass back and forth between measurement and control circuits 210 and 212 using the arrangement illustrated in FIG. 9. The level shifting circuitry is disposed in level shifter 222.

Measurement and control circuits 210 and 212 communicate with the V-bus through Digital-to-Analog converter (D/A) and logic circuit 224 in measurement and control circuit 210. Thus signals pass between D/A and logic circuit 224 and V-bus cell 120A through ddo, udo, udi and ddi ports of V-bus cell 120A as shown in FIG. 8. Also, data can pass along the V-bus through ports 130 and 145 in FIG. 8.

Similarly, measurement and control circuits 214 and 216 and V-bus cell 120B cooperate together on chip 220 as measurement and control circuits 210 and 212 and V-bus cell 120A cooperate as described above.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the methods and systems of the present invention, like related systems and methods used in the electronics arts are complex in nature, are often best practiced by empirically determining the appropriate values of the operating parameters, or by conducting computer simulations to arrive at best design or best circuit for a given application. Accordingly, all suitable modifications, combinations and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A circuit for controlling and monitoring voltages, comprising:
    a first V-bus circuit;
    a first measurement and control circuit in communication with the first V-bus circuit; and
    a second measurement and control circuit in communication with the first measurement and control circuit,
    wherein the first and second measurement and control circuits are configured to operate in different voltage ranges.

2. The circuit of claim 1, wherein the first measurement and control circuit is disposed in a P-substrate and the second measurement and control circuit is disposed in a deep N-well region.

3. The circuit of claim 1, wherein the first measurement and control circuit comprises
    digital-to-analog circuit and a logic control circuit.

4. The circuit of claim 3, wherein the first measurement and control circuit communicates with the first V-bus circuit through the digital-to-analog circuit and the logic control circuit.

5. The circuit of claim 1, wherein the second measurement and control circuit comprises a level shifter.

6. The circuit of claim 1, wherein the first and second measurement and control circuits are configured to pass signals back and forth therebetween.

7. The circuit of claim 1, wherein the first and second measurement and control circuits are configured to control a series of batteries connected to the first and second measurement and control circuits.

8. The circuit of claim 1, wherein the first V-bus circuit comprises:
    a first level circuit;
    a level shifter connected to the first level circuit; and
    a second level circuit connected to the level shifter,
    wherein the level shifter is configured to control inputs of the first and second level circuits.

9. The circuit of claim 1, further comprising:
    a second V-bus circuit,
    a third measurement and control circuit in communication with the second V-bus circuit; and
    a fourth measurement and control circuit in communication with the third measurement and control circuit,
    wherein the third and fourth measurement and control circuits are configured to operate in different voltage ranges.

10. The circuit of claim 9, further comprising a capacitor, wherein the capacitor is connected between the first V-bus circuit and the second V-bus circuit.

11. A method for monitoring and controlling a series of batteries, comprising:

operating first and second measurement circuits in different voltage ranges, the second measurement and control circuit being in communication with the first measurement and control circuit and the first measurement and control circuit being in communication with a V-bus circuit; and controlling a voltage of a series of batteries connected to the first and the second measurement and control circuits using the V-bus circuit.

12. The method of claim 11, wherein the controlling using the V-bus circuit comprises controlling first and second level circuits connected via a level shifter within the V-bus circuit.

13. The method of claim 12, wherein the controlling of first and second level circuits comprises controlling a port connected to an output of first, second, third and fourth logic gates, and controlling inputs of the first, the second, the third and the fourth logic gates.

14. The method of claim 13, wherein the controlling of the inputs comprises inputting a logic level to one of the first or second logic gates to produce a hard level.

15. The method of claim 13, wherein the controlling of the port comprises setting the port to receive a logic level such that when the port receives the logic level, one of the third and fourth logic gates provides soft reinforcement to the logic level at the port and transferring the logic level to the level shifter.

16. A circuit for controlling and monitoring voltages, comprising:
 a first V-bus circuit comprising a first level circuit;
 a level shifter connected to the first level circuit;
 a second level circuit connected to the level shifter; and
 a capacitor connected to a terminal of the second level shifter,
 wherein the level shifter is configured to control inputs of the first and second level circuits;
 a first measurement and control circuit in communication with the first V-bus circuit; and
 a second measurement and control circuit in communication with the first measurement and control circuit,
 wherein the first and second measurement and control circuits are configured to operate in different voltage ranges.

* * * * *